United States Patent [19]

Oosterhof

[11] Patent Number: 5,062,750
[45] Date of Patent: Nov. 5, 1991

[54] SANDWICH PANEL CUTTING METHOD AND MACHINE TOOL

[75] Inventor: Lukas Oosterhof, Zevenhizen, Netherlands

[73] Assignee: Hunter Douglas International NV, Curacao-Netherlands, Netherlands Antilles

[21] Appl. No.: 530,359

[22] Filed: May 31, 1990

[30] Foreign Application Priority Data

Jun. 2, 1989 [GB] United Kingdom ............... 8912705

[51] Int. Cl.$^5$ ............... B23B 51/08; B23C 1/20; B23C 3/00
[52] U.S. Cl. ............... 409/132; 83/783; 408/26; 409/190; 409/229
[58] Field of Search ............... 83/783; 409/131, 132, 409/236, 228, 229, 190; 408/22, 24, 25, 26, 28, 29, 20, 21; 144/35 R, 134 A, 371

[56] References Cited

U.S. PATENT DOCUMENTS

| 2,238,578 | 4/1941 | Burkeman | 408/22 |
| 2,670,018 | 2/1954 | Coates | 144/134 A |
| 2,799,305 | 7/1957 | Groehn | 144/134 A X |
| 3,129,734 | 4/1964 | Bobryk | 408/26 X |
| 4,030,402 | 6/1977 | Onsrud | 279/1 DC X |
| 4,830,554 | 5/1989 | Lopez | 409/190 X |

Primary Examiner—Steven C. Bishop
Attorney, Agent, or Firm—Fleit, Jacobson, Cohn, Price, Holman & Stern

[57] ABSTRACT

A method and apparatus for cutting a workpiece, such as a panel, in particular a sandwich panel, in which an elongate milling cutter 21 is mounted in axially spaced bearings 18, 19. A workpiece is supported on a support 11 and a relative cutting sweep movement between the supported workpiece and the elongate cutter is caused to take place in at least one direction transverse to the axis of the cutter, whereby the cut is made in that transverse direction.

16 Claims, 4 Drawing Sheets

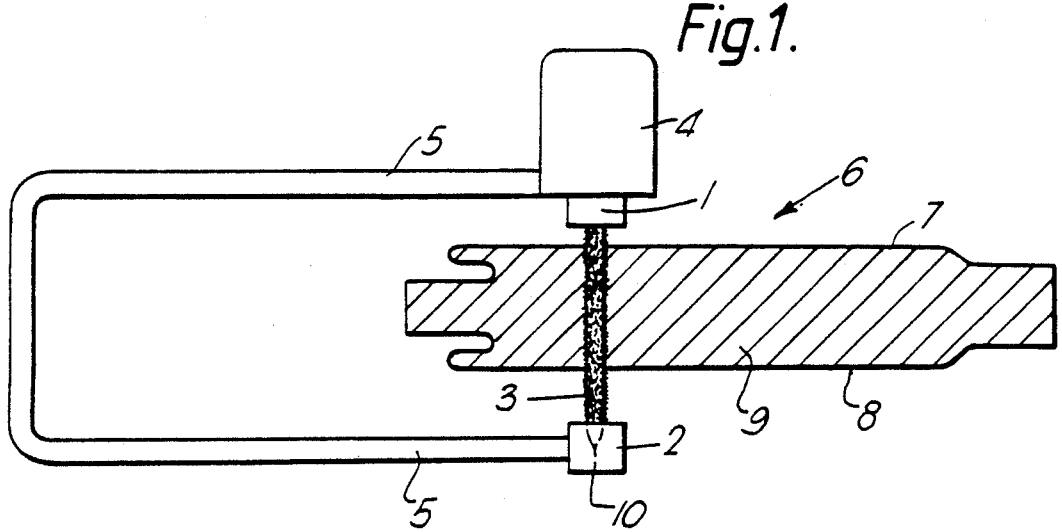
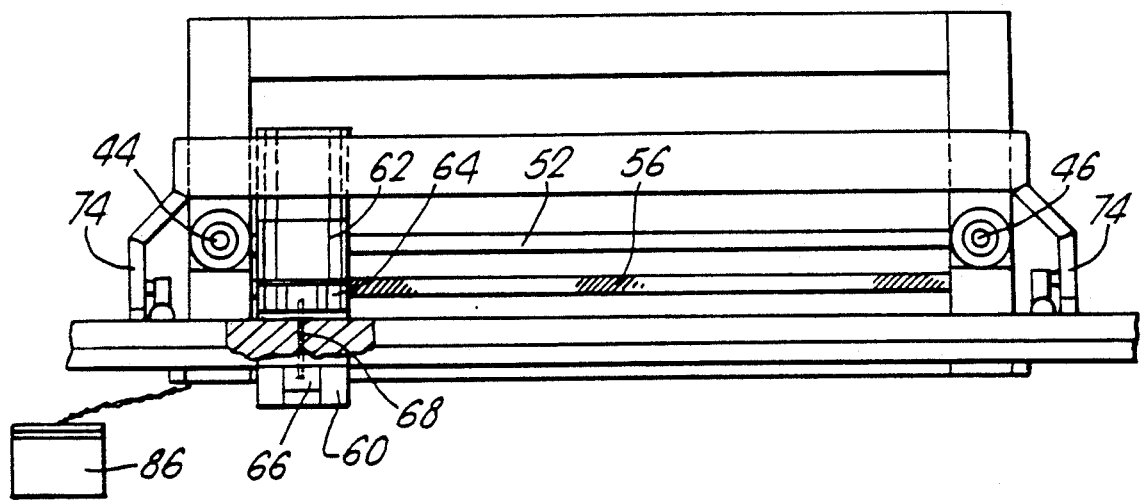

SANDWICH PANEL CUTTING METHOD AND MACHINE TOOL

BACKGROUND OF THE INVENTION

The present invention relates to a method and apparatus for cutting a workpiece to sever a part of the workpiece from the rest.

A conventional method of cutting a workpiece, in particular for cutting a panel, involves the use of a circular saw. However, experience has shown that the use of a circular saw on a panel, especially panels of the sandwich construction involving the use of inner and outer skins with a compact core material therebetween, is excessively noisy often having a noise level of more than 100 dB. Since it is very common for a substantial amount of cutting to have to be done plus as to the overall dimensions of the panel and the formation of apertures, for example for windows, the total noise can become almost unbearable.

SUMMARY OF THE INVENTION

It is now proposed, according to the present invention of cutting a workpiece, to sever a part of the workpiece from the rest, said method to provide a method comprising rotatably supporting an elongate milling cutter in bearings which are spaced apart in the axial direction of the elongate cutter, said cutter having an effective cutting length in accordance with an appropriate dimension of the workpiece to be cut, supporting a workpiece and effecting relative cutting sweep movement between the supported workpiece and the elongate cutter, said relative movement taking place in at least one direction transverse to the axis of the cutter, whereby the cut is made in that transverse direction.

It has been found that using such a method it is possible to reduce the noise level down to approximately 25 dB which is perfectly acceptable.

Preferably said cutter has a sharpened drilling or piercing end and said sharpened end and a relevant one of said bearings are temporarily disengaged from one another for initial relative movement between said workpiece and said cutter to pierce or drill through said workpiece, whereafter said cutter and said relevant bearing are re-engaged and the cutting sweep movement is carried out.

But while the method of the present invention can be utilized for cutting any workpiece, it is particularly designed for cutting a panel, such as a sandwich panel. In these circumstances, the cutting direction or directions in which the relative movement takes place is or are substantially parallel to or are in the plane of the panel.

It is also proposed, according to the present invention, to provide a workpiece cutting apparatus, to sever a part of the workpiece from the rest, said apparatus comprising means to support a workpiece, a pair of axially spaced apart bearings, a frame member directly connecting said bearings, an elongate milling cutter mounted for rotation in said bearings about its axis, said cutter having an effective cutting length in accordance with an appropriate dimension of the workpiece to be cut, means to rotate said cutter about its axis and means to effect a cutting sweep of said cutter relative said supporting means in at least one direction transverse to the axis of the cutter, whereby the cut is made in that transverse direction.

BRIEF DESCRIPTION OF DRAWINGS

In order that the present invention may more readily understood, the following description is given, merely by way of example, reference made to the accompanying drawings in which:

FIG. 1 is a schematic view of one embodiment of milling cutter arrangement for carrying out the cutting method according to the invention;

FIG. 5 and FIG. 6 are plan and end views of the apparatus illustrated in FIG. 4.

DESCRIPTION OF PREFERRED EMBODIMENTS

Figure 2:
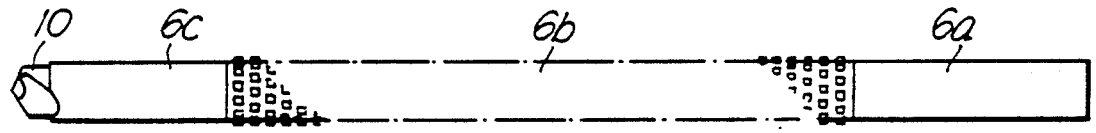
FIG. 2 is an enlarged view of the cutter of the apparatus of FIG. 1.

The cutting arrangement illustrated very schematically in FIG. 1 includes first and second bearings 1 and 2, in which it is releasably mounted an elongate milling cutter 4. The cutter is driven by a motor 3.

The drawing illustrates, very schematically, a frame 5 which is used accurately to join directly and to space the first and second bearing members 1 and 2. Also illustrated in the drawing is a sandwich panel 6 including front and rear metal (usually aluminium) skins 7, 8 and a central insulating filling 9 of any suitable material, such as polystyrene, fiber, chip board, etc.

Experience has shown that by using a milling cutter of this elongate nature which is mounted securely at each end, one can cut through a panel-like structure such as the sandwich panel 6 with relatively little noise. The actual cut will take place in a cutting sweep which may, for example, be in the plane of the paper of FIG. 1 or may be perpendicular to that plane. It is also contemplated that with the structure of the invention one could readily cut a window or other opening in the panel and for this purpose the structure is made so that either the second bearing 2 or the milling cutter or both can be removed, the cutter itself having a pointed end shown schematically at 10. The cutter is illustrated in an enlarged manner in FIG. 2 and includes a first cylindrical shank portion 6a, a generally cylindrical centre portion 6b and a second cylindrical shank portion 6c, portions 6a, 6b and 6c all having the same dimension, e.g. 12 mm. Shank portions 6a and 6c engage in bearings 1 and 2 respectively. The pointed end 10 can also be seen in this Figure. This pointed end is used to drill through the panel and after this has been done the second bearing 2 is replaced and the cutting sweep commenced. Various means may be provided to mount the workpiece, preferably generally rigidly, and for causing relative movement between the cutter and the workpiece, either by moving one or the other or both.

Figure 3:
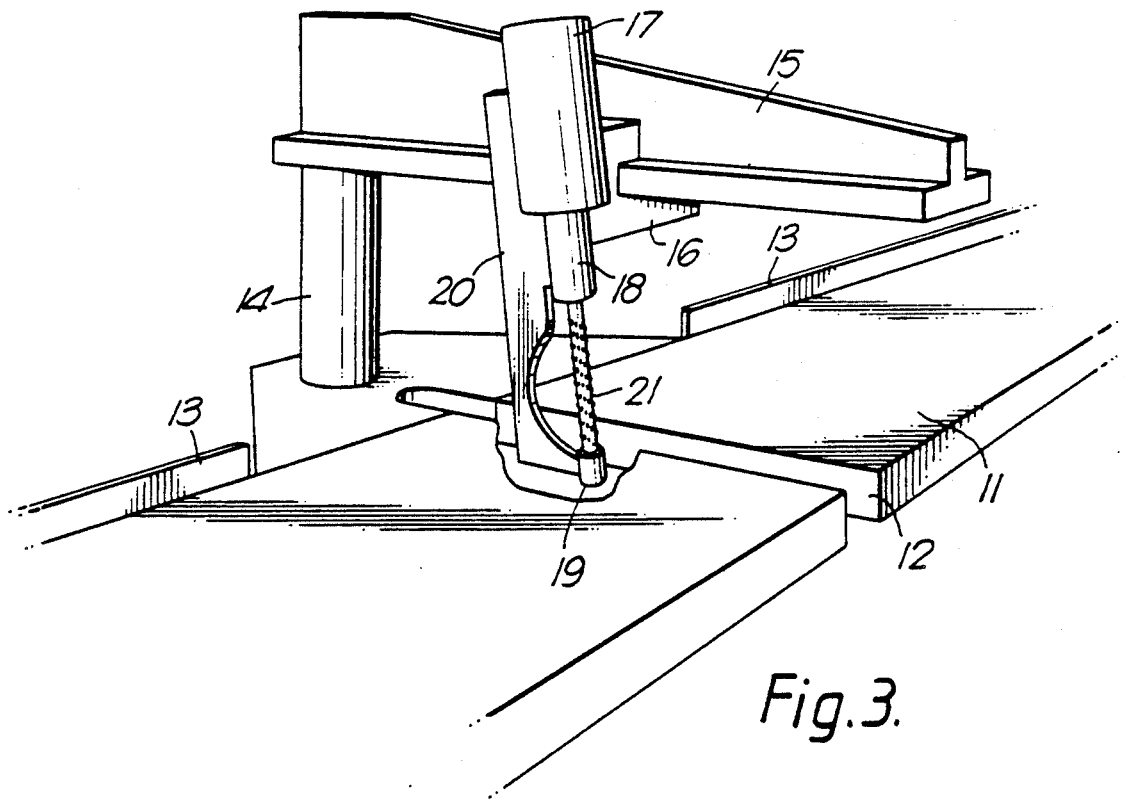
FIG. 3 is a perspective view of a modified form of cutter arrangement of FIG. 1.

FIG. 3 illustrates a fourth structure in which a support table 11 is provided for a panel workpiece (not shown) the table having a slot 12 formed therein and a fence 13 to position the workpiece. Extending upwardly from the rear of the table is a pillar 14 from which is cantilevered a guide track 15, which extends parallel to the surface of the table 11 above the slot 12. Accurately slidable along track 15 is a carriage 16, on which is mounted a motor 17. Associated with the motor is a first bearing or chuck 18 and a second bearing 19 is directly connected to the first bearing by a flat cross-section frame member 20. The bearings 18, 19 support a cutter 21 similar to that illustrated in FIG. 2. It will be noted that the axis of the cutter is inclined to the vertical, so that it extends at an angle to the plane of the workpiece. This enables a corner of the workpiece to be at readily cut.

The thickness of the frame 20 is less than the diameter of the cutter 21, so that the frame can pass through the cut made by the cutter.

Figure 4:
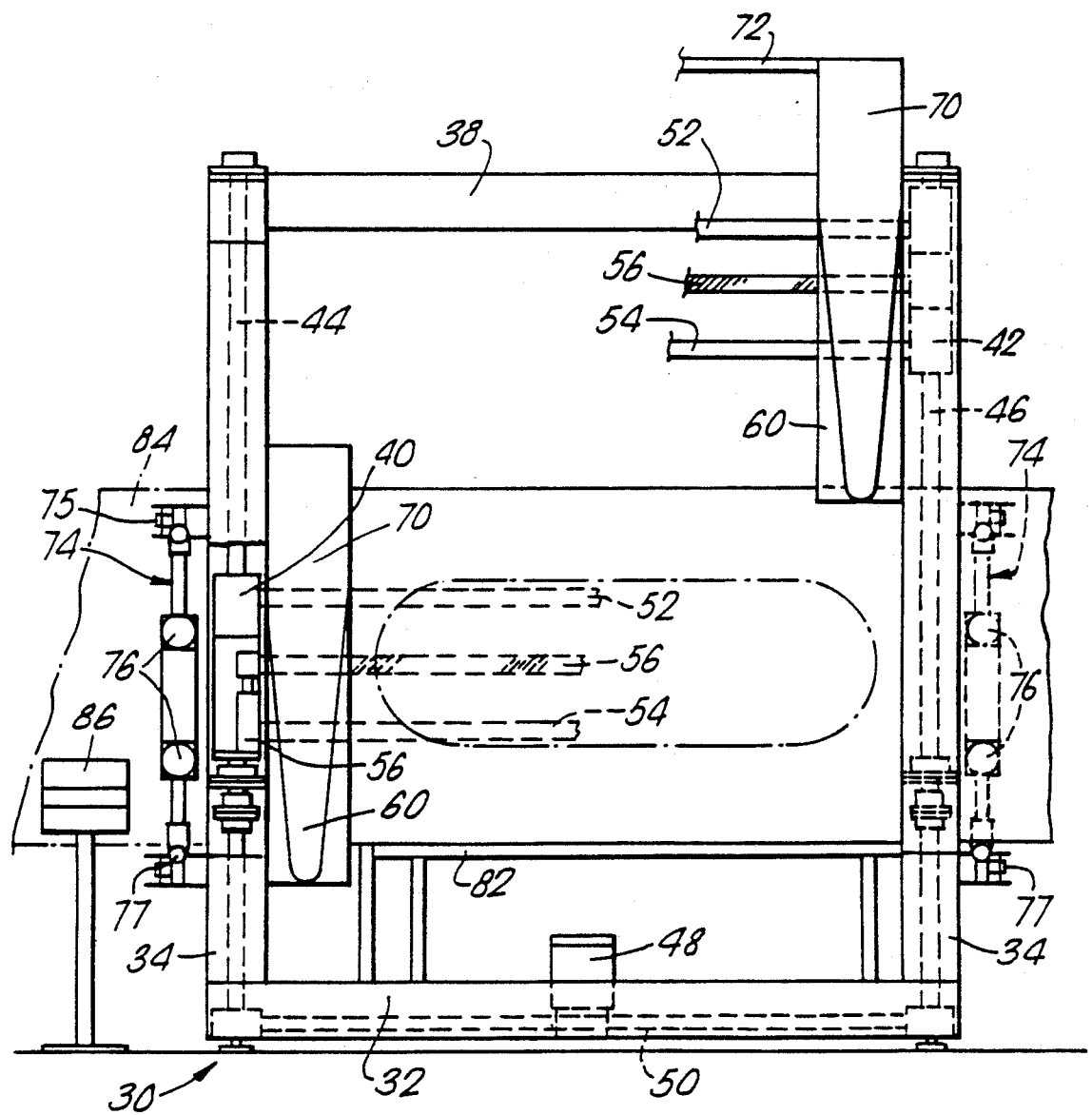
FIG. 4 is a front view of the apparatus incorporating such a milling cutter.
Figure 6:
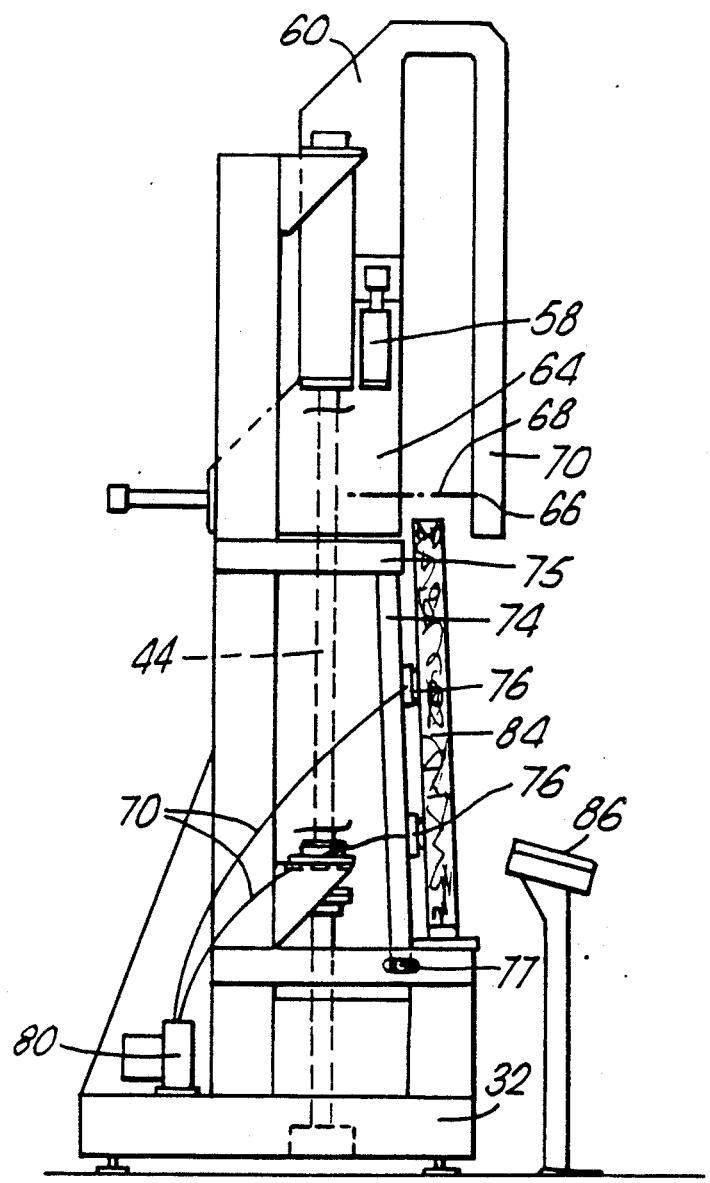

Such arrangements are illustrated, by way of example, in the apparatus structure of FIGS. 4, 5 and 6. Frame 30 includes a base 32, two uprights 34, 36 and an upper cross-piece 38. Two carriages 40, 42 are mounted for vertical movement in the uprights 34, 36 by means of screw threaded rods 44, 46 and associated nuts (not shown), the rods being driven by a motor 48 on the base 32 and drive chains 50. Extending between the two carriages 40, 42 are upper and lower guide rods 52, 54 and a transverse elongate screw threaded rod 56 which can be caused to rotate by a motor 58 (FIG. 6). Axially slidable along the guide rods 52, 54, and driven by the screw threaded rod 56 and a nut (not shown) is a movable saddle 60 upon which is mounted a cutter motor 62 and first and second bearings 64, 66. Mounted for rotation within the bearings 64, 66 and to be driven by the motor 62 is an elongate milling cutter 68. The cutter 68 is mounted so as to be axially movable from and to the second bearing 66 for drilling through a workpiece in a manner described in relation to the schematic arrangement of FIG. 1.

Also carried on the saddle 60 is a hood 70 to receive sawdust, this hood being provided with a suction hose 72 connected to a vacuum pump (not shown).

In order to mount a workpiece, such as a panel, a supporting frame 74 is carried by the main frame 30 and itself is provided with several suction cups 76 connected by hoses 78 to a further vacuum pump 80. The frame 30 is also provided with a roller conveyor 82 to facilitate the introduction of a workpiece 84 (FIGS. 4 and 6) and which can then be engaged by the suction cups. It will be noted that the disposition of the suction cups 76 is such that the workpiece is inclined at a slight angle to the vertical. The frame 74 is in fact pivotally mounted at 75 and lockable at 77 in a number of different angular positions.

If one wishes to make an end cut, that is to say one which is effectively a vertical movement between the cutter and the workpiece, then this inclined position is preferred as shown in the drawings, because the relative movement between the cutter and the workpiece will cause, in effect, axial movement between the cutter and the workpiece, so that the cutter is itself not subject to wear at one particular axial location. Also the engagement of the cutter with the material to be cut will be more gradual in this manner. If one wishes to make a cut in the horizontal direction as shown in the drawings, then the workpiece will be held in a vertical position, as it will also if a window is being cut.

The drawing also illustrates very schematically a control console 86 which is connected to activate the various motors as desired in order to achieve a particular relative movement between the cutter and the workpiece. This can involve the use of a programmed control to give an accurate repetition if so desired.

The control may also involve the ability to vary the speed of the cutter and the speed of relative movement between the cutter and the workpiece.

I claim:

1. A method of cutting a workpiece, to sever a part of the workpiece, said method comprising the steps of rotatably supporting an elongate milling cutter in bearings which are spaced apart in an axial direction of the cutter, said cutter having a longitudinal axis and an effective cutting length related to a thickness dimension of the workpiece to be cut, supporting the workpiece in cutting position relative to the cutter and effecting relative cutting sweep movement between the workpiece and the cutter, said relative movement taking place in at least one cutting direction transverse to the axis of the cutter, whereby a cut is made in the workpiece in the cutting direction wherein said cutter has a sharpened end and prior to making said cut, said sharpened end and a relevant one of said bearings are temporarily disengaged from one another, relative movement is effected between said workpiece and said cutter in the axial direction of said cutter to pierce through said workpiece, and said cutter and said relevant bearing are then re-engaged for carrying out said cutting sweep movement.

2. A method of cutting a workpiece, to sever a part of the workpiece, said method comprising the steps of rotatably supporting an elongate milling cutter in bearings which are spaced apart in an axial direction of the cutter, said cutter having a longitudinal axis and an effective cutting length related to a thickness dimension of the workpiece to be cut, supporting the workpiece in cutting position relative to the cutter and effecting relative cutting sweep movement between the workpiece and the cutter, said relative movement taking place in at least one cutting direction transverse to the axis of the cutter, whereby a cut is made in the workpiece in the cutting direction wherein said workpiece is a planar panel and wherein said at least one cutting direction in which said relative movement takes place is angled with respect to the plane of the panel.

3. A method according to claim 2, wherein said cutter is arranged at an angle other than perpendicular to said direction of relative movement.

4. A method according to claim 2, wherein the speed of rotation of said cutter is changed during the sweep movement.

5. A method according to claim 2, wherein the speed of said relative cutting sweep movement is changed during the sweep movement.

6. A workpiece cutting apparatus comprising supporting means to support a workpiece, a pair of axially spaced apart bearings, an elongate milling cutter mounted for rotation in said bearings about a longitudinal cutter axis, a frame member connecting the bearings, said cutter having an effective cutting length related to a thickness dimension of the workpiece to be cut, means to rotate said cutter about said axis and means to effect a cutting sweep of said cutter relative to said supporting means in at least one cutting direction transverse to the axis of the cutter to make a cut in the workpiece in the cutting direction wherein said frame is formed of sheet material having a thickness less than the diameter of said cutter, whereby the frame may pass through the cut formed by the cutter.

7. Apparatus according to claim 6, wherein said frame is placed directly adjacent said cutter.

8. Apparatus according to claim 6, wherein said cutter has a sharpened end, and said sharpened end and a relevant one of said bearings are disengageable from one another to allow initial relative movement between said workpiece and said cutter effective in the axial direction of said cutter to enable the cutter to pierce through said workpiece whereafter said cutter and said relevant bearing can be re-engaged for the subsequent cutting sweep movement to be carried out.

9. A panel cutting apparatus comprising supporting means to support a panel, a pair of axially spaced apart bearings, an elongate milling cutter mounted for rotation in said bearings about a longitudinal cutter axis, a frame member connecting the bearings, said cutter having an effective cutting length related to a thickness dimension of the panel to be cut, means to rotate said cutter about said axis and means to effect a cutting sweep of said cutter relative to said supporting means in at least one cutting direction transverse to the axis of the cutter to make a cut in the panel in the cutting direction wherein said supporting means is adapted to mount a panel in an angularly adjustable plane substantially perpendicular to the axis of said milling cutter, and said at least one cutting direction in which said relative movement takes place is angled with respect to the plane of the panel.

10. Apparatus according to claim 9, wherein said means to effect said cutting sweep movement comprise rotationally driven threaded rods.

11. Apparatus according to claim 9, and further comprising a fixed frame member, a carriage member movable with respect thereto and wherein said bearings, said cutter and said cutter rotating means are mounted on said carriage member and wherein workpiece supporting means is stationarily mounted on said fixed frame.

12. Apparatus according to claim 8, wherein said cutter is retractable from the one bearing remote from its driven end.

13. A workpiece cutting apparatus comprising support means for supporting a planar workpiece in a specified plane, a pair of axially spaced apart bearings, an elongate milling cutter mounted for rotation in said bearings about a longitudinal cutter axis, a frame member connecting the bearings, said cutter having an effective cutting length related to a thickness dimension of the workpiece to be cut, means to rotate said cutter about said axis, and means to effect a cutting sweep of said cutter relative to said supporting means in at least one cutting direction which is angled with respect to the plane of the workpiece thereby providing relative axial movement between the cutter and the workpiece during said cutting sweep movement.

14. Apparatus according to claim 13 wherein the said supporting means is adjustable for varying the angle of said plane.

15. A workpiece cutting apparatus comprising support means for supporting a planar workpiece in a specified plane, a pair of axially spaced apart bearings, an elongate milling cutter mounted for rotation in said bearings about a longitudinal cutter axis, a frame member connecting the bearings, said cutter having an effective cutting length related to a thickness dimension of the workpiece to be cut, means to rotate said cutter about said axis and means to effect a cutting sweep of said cutter relative to said supporting means in at least one cutting direction substantially parallel to said plane wherein the cutter axis is disposed at a non-perpendicular angle to said cutting direction.

16. Apparatus according to claim 15 wherein said cutter has a sharpened end, and said sharpened end and a relevant of one of said bearings are disengageable from one another to allow relative movement between said workpiece and said cutter effective in the axial direction of said cutter to enable the cutter to pierce through said workpiece whereafter said cutter and relevant bearing can be re-engaged for subsequent cutting sweep movement.

* * * * *